(No Model.) J. REESE. 3 Sheets—Sheet 1.
PROCESS OF AND PLANT FOR PRODUCING CAST IRON HIGH IN CARBON
AND WITH A PREDETERMINED PERCENTAGE OF SILICON.
No. 287,054. Patented Oct. 23, 1883.

(No Model.) J. REESE. 3 Sheets—Sheet 2.
PROCESS OF AND PLANT FOR PRODUCING CAST IRON HIGH IN CARBON
AND WITH A PREDETERMINED PERCENTAGE OF SILICON.
No. 287,054. Patented Oct. 23, 1883.

(No Model.) J. REESE. 3 Sheets—Sheet 3.
PROCESS OF AND PLANT FOR PRODUCING CAST IRON HIGH IN CARBON
AND WITH A PREDETERMINED PERCENTAGE OF SILICON.
No. 287,054. Patented Oct. 23, 1883.

UNITED STATES PATENT OFFICE.

JACOB REESE, OF PITTSBURG, PENNSYLVANIA.

PROCESS OF AND PLANT FOR PRODUCING CAST-IRON HIGH IN CARBON AND WITH A PREDETERMINED PERCENTAGE OF SILICON.

SPECIFICATION forming part of Letters Patent No. 287,054, dated October 23, 1883.

Application filed February 21, 1883. (No model.)

*To all whom it may concern:*

Be it known that I, JACOB REESE, a citizen of the United States, residing at Pittsburg, county of Allegheny, and State of Pennsylvania, have invented certain improvements in process of and plant for the manufacture of cast-iron high in carbon and with a predetermined percentage of silicon direct from the blast-furnace, of which the following is a full, clear, and exact description.

The principal objects of my invention are to produce a uniform chilling metal from any kind of stock, and to produce chilled cast-iron car-wheels direct from the blast-furnace without the use of any fuel except that used in reducing the ores. These objects I secure by the production of a silicious metal, then causing it to flow into an open hearth, and therein desiliconizing it by the use of metallic oxides, then resiliconizing it to the desired degree by the use of a silicious pig or a ferro-silicide, the open hearth being heated by the waste gases of the blast-furnace.

Figure 1:
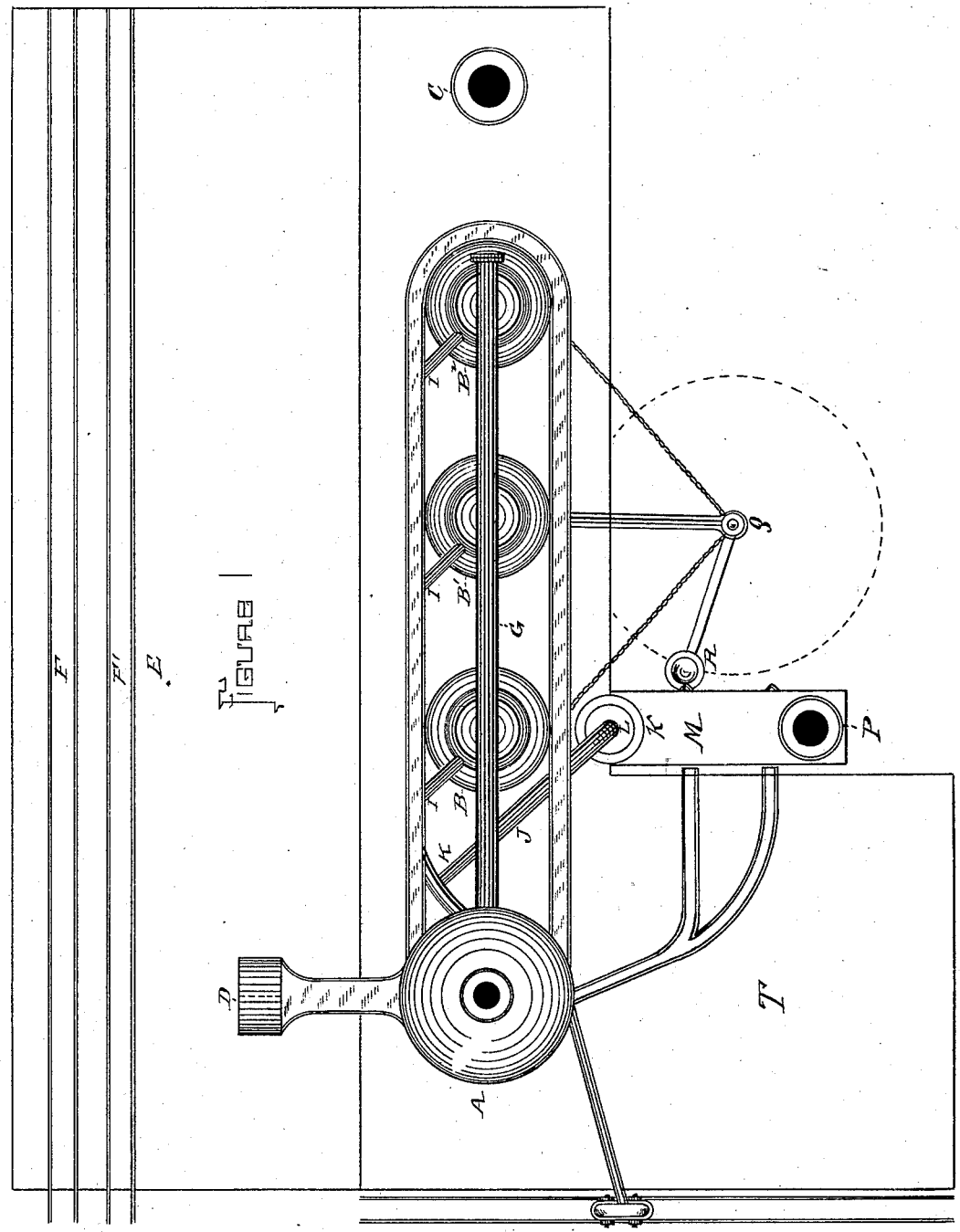
Figure 2:
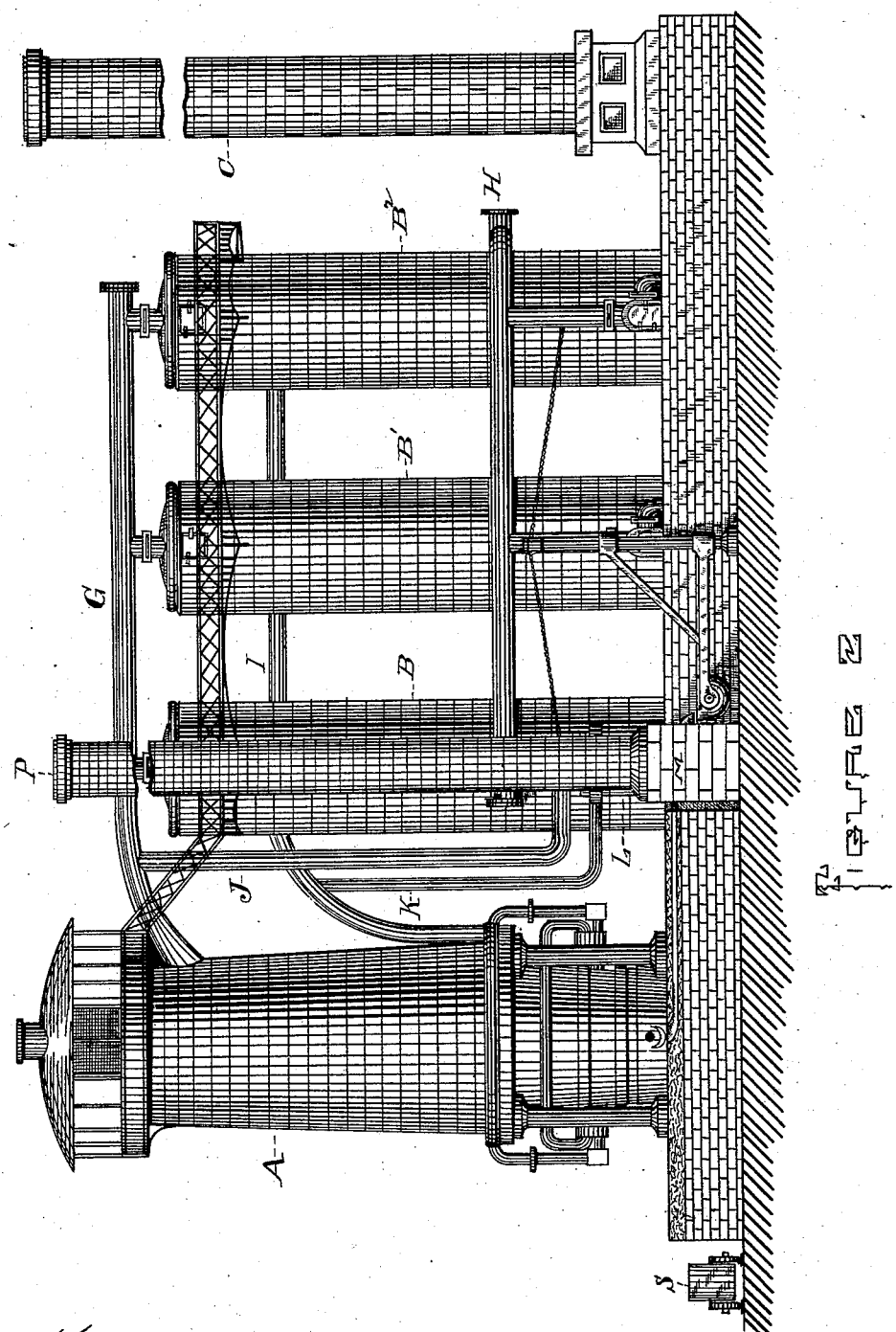
Figure 3:
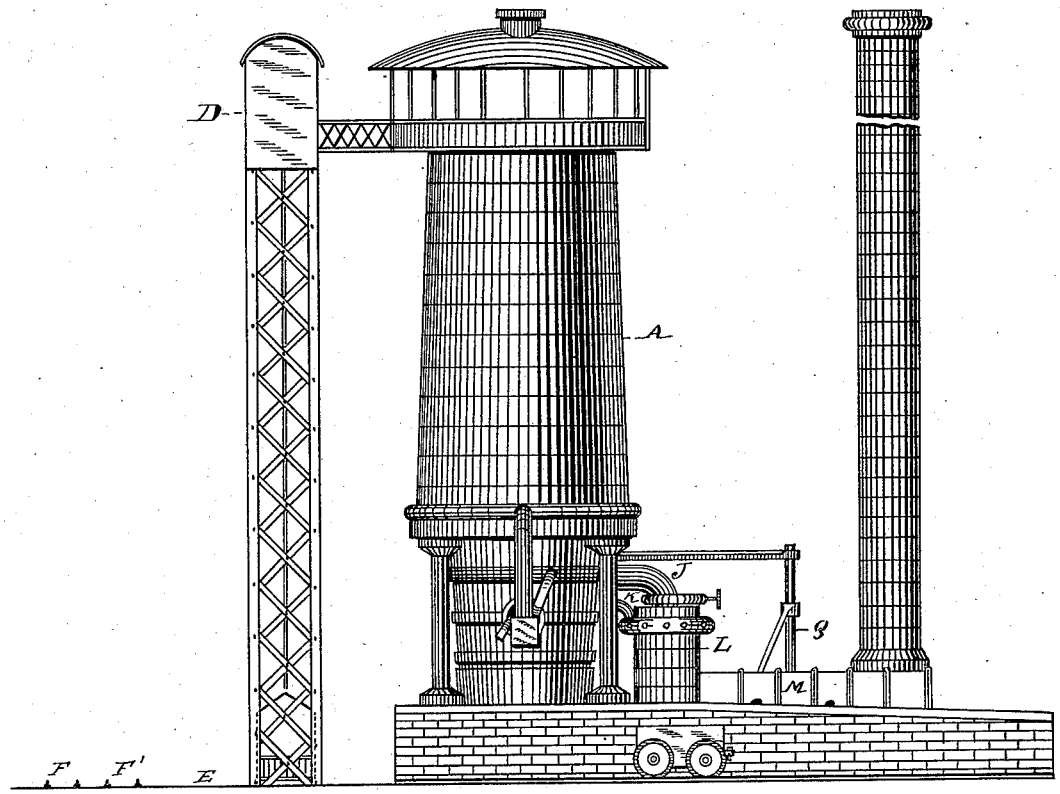
Figure 4:
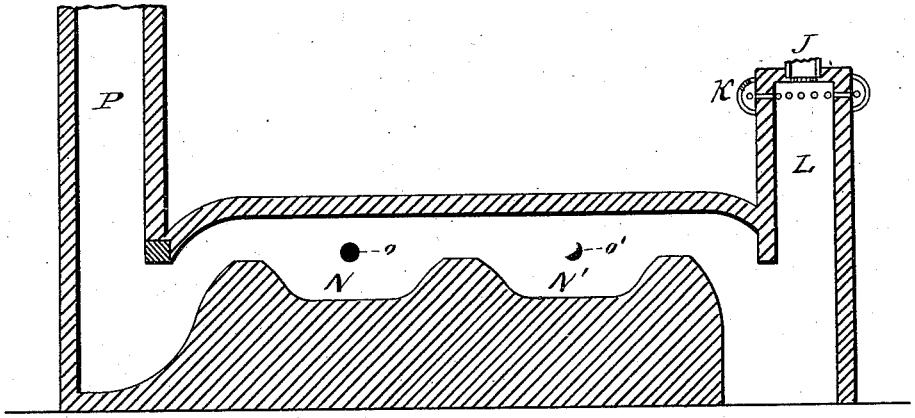

Figure 1 of the drawings is a ground plan of my improved blast-furnace plant. Fig. 2 is a front elevation of same. Fig. 3 is an end elevation of same. Fig. 4 is a sectional view of the open hearth and its combustion-chamber.

A in the drawings is the blast-furnace. B B' B² are the hot-blast regenerators. C is the waste-gas stack. D is the stock-elevators. E is the stock-house. F F' are the stock-house railroads. G is the waste-gas conduit. H is the cold-blast pipes. I is the hot-blast pipes. J is a branch pipe leading from the gas-conduit to the combustion-chamber of the open hearth. K is a branch pipe leading from hot-blast pipe I to the combustion-chamber. L. M is the open hearth with its double chambers N N. O O' are openings through which the fluid metal enters the furnace. P is the stack of the open-hearth furnace. Q is the crane, R the ladle, and S a slag-car. T is the casting-house.

In the manufacture of chilled cast-iron car-wheels as heretofore practiced pig metal of the quality known as "chilling-iron" is melted in a cupola and cast into suitable molds having cast-iron rings for chilling the periphery or tread of the wheels. The treads of the wheels are chilled, in order to harden the wearing-surface, and thus increase the life of the wheel; but though the chilling operation hardens the wearing-surface, it tends to make the wheel more liable to break by concussion, such as occurs when passing over the end of rails when the track is uneven; hence it is very important that a wheel should have a uniform chill over its entire tread; but it is also important that all the wheels on a car should possess an equal and uniform chill. In order to secure an equal and uniform chill in the tread of a series of wheels, manufacturers find it necessary to test a sample of the molten metal from every heat by pouring it into a chilling-mold, and by mixing the different qualities a chill of the required depth is secured. Some grades of cast-iron will not chill at all, while others chill indifferently, and others are good chilling-irons. Now, I have discovered that silicon, when present in cast-iron, tends to prevent it from chilling, and the best chilling-iron is that which contains silicon in the least degree.

Chilling-iron has heretofore been generally made by smelting the ores with charcoal in the blast-furnace, because the charcoal has much less silicious matter in its ash than coal or coke has, and because a furnace using charcoal as fuel is run at a lower temperature than one run on coal or coke, and when the furnace is run at a comparative low temperature but little silica is reduced, and the metal is comparatively low in silicon compared with that produced at a high temparature. For these reasons a good chilling-iron is made with charcoal as fuel, and is a high-priced iron.

As before stated, the chilling of the metal tends to harden it, and largely increases its wearing ability, but at the same time it becomes more liable to break by concussion; hence a car-wheel is only chilled on the tread and only to a depth which the wheel is liable to wear. For these reasons it is very desirable to have an iron which will exhibit a uniform and absolute chill to the depth required, and no farther. Such an iron has never been obtainable heretofore; but by the use of my discovery that silicon tends to prevent chilling, and by eliminating the silicon and then recharging silicon, a metal may be produced which will exhibit any degree of chill desired with absolute certainty.

In the practice of this invention with a blast-furnace plant such as shown in the drawings the coke, ore, and limestone are run into the stock-house E on the railroads F F' and unloaded. They are then put into wheelbarrows, run into the elevator D, raised up to the top, and dumped into the blast-furnace A. The fire having been lighted, a blast of air is blown through the cold-blast pipe H, which is caused to flow through the regenerator B², and from thence through the hot-blast pipe I and the tuyeres into the furnace. The blast-furnace A is provided with a bell and hopper for closing the top, so that the product of combustion is forced through the conduit G into and down through the regenerators B and B', and from thence into the gas-stack C. When the regenerator B' has become hot, the valves are changed, so that the gas is excluded from B' and caused to enter B², and the cold air is caused to pass through the hot regenerator B'. The air-blast in passing through the hot regenerator B' is highly heated, and passes into the furnace at about 1,500° Fahrenheit. While this is being done the other regenerators are being highly heated, and by thus alternately passing hot gases and cold air into the regenerators a continuous supply of highly-heated air is secured. After the blast-furnace and the regenerators have become properly heated, a portion of the gases is caused to flow from the conduit G through pipe J into combustion-chamber L. A portion of the hot blast is also caused to pass from pipe I through branch pipe K into the combustion-chamber L. This hot blast enters the combustion through a series of small openings from the annular pipe K K, and the gases are consumed and a high heat is produced, which passes through the open-hearth furnace M and out of stack P. This open-hearth furnace is provided with a central bridge, so as to form two distinct metal chambers of a capacity of fifteen tons each, (more or less,) according to the capacity of the blast-furnace. When the open hearth is properly heated, the furnace A is tapped, and the metal (minus the slag) is caused to flow into chamber N' through O'. When the chamber is filled, the blast-furnace is plugged, and from five to twenty per cent. of oxide of iron (iron ore) is charged into the metal chamber N'. The oxide thus admixed with the metal will be attracted by the silicon contained in the metal, producing two favorable results: first, the oxide of iron will be reduced, the oxygen going to the silicon and the iron going into the metal; second, the oxygen will oxidize the silicon to silicic acid, which will eliminate the silicon from the metal, and the silicic acid will pass into the slag. While this operation is being performed care should be taken that the temperature of the open hearth is kept as low as is consistent with maintaining the metal in a fluid condition. Care should also be taken to charge the oxide at different intervals, as a high temperature or an excess of oxide will cause the carbon to be oxidized and the metal to boil before the silicon is entirely eliminated; but when the temperature is kept down to a degree but little above the fusion-point of the metal, and an excess of oxide is not employed, the metal will remain in a state of rest until the silicon is reduced to .020. When the silicon has been thus reduced, the carbon will be attacked and the metal will boil. At this juncture a final charge of silicon is added, as silicious pig, or as a ferro-silicide. As soon as the final charge of silicon is added, the boiling subsides and the metal again assumes a state of rest. During this operation of desiliconizing the first charge, at a period of about three hours after the first charge has been run into the open hearth, the blast-furnace is again tapped and the metal caused to flow into metal-chamber N' until it is charged. Thus the open hearth may contain two charges at the same time. When the first charge has been desiliconized and re-siliconized, it is tapped and caused to run into the ladle R, and from it distributed into the molds by means of the crane Q. When this is done chamber N' is again charged, and thus the metal is desiliconized and resiliconized in each chamber successively, as before described.

Two separate open-hearth furnaces may be employed; but I prefer the arrangement of furnace shown in the drawings as a matter of economy in the use of gas.

The presence of silicon in the metal to the amount of .75 per cent. will prevent it from chilling, and if the silicon is as low as .05, it will produce a very hard and excessive chill. The amount of chill secured in any metal will also depend on the thickness and temperature of the metal surface against which the molten iron is cast. Therefore the percentage of silicon required to produce any given depth of chill will vary with the thickness and temperature of the chilling-mold, as well as with the bulk of the metal to be chilled. In the production of chilled-iron car-wheels the chilling-rings should be made of uniform size, thickness, and weight, and they should, as far as possible, be used at a uniform temperature, so that a uniform effect may be secured. With uniform chilling-molds at a uniform temperature the amount of silicon required to produce a uniform chill of the depth desired can readily be determined, and, having a desirable uniform chill, the wheels will possess uniform strength and enduring qualities.

In a former application, upon which Letters Patent No. 241,718 were granted to me, the molten metal was decarbonized, as well as desiliconized, and then recarburized and resiliconized, before being subjected to a "dead-melt," and said process differs from the present in respect to the step of decarburization, as well as in other points, which will more fully appear on reference to said patent; also, in another application, on which Letters Patent No. 281,729 were granted, I described a process for obtaining a metal for foundry purposes wherein molten silicous cast-iron was run from a blast-furnace into an open hearth and therein treated with oxide of iron, or an oxidizing-flame at a high temperature, and while maintained in a state of rest until the silicon was eliminated without a material reduction of the carbon; and in this latter process it was proposed to add a small amount of silicious pig, to preserve the fluidity of the metal without loss of carbon where the molten metal could not be immediately cast, such added silicon, however, being always eliminated before the metal was cast; but said process differs from the present in the step of permanent resiliconization and the temperature, as well as in other material points, which will more fully appear on reference to said patent. I therefore herein disclaim said processes, and, as I am also aware that it has heretofore been proposed to use an open hearth in combination with a blast-furnace, I do not herein claim such subject-matter, broadly.

The object I have in view in combining a blast-furnace and an open hearth, as hereinbefore set forth, is threefold: first, to utilize the heat of the molten metal as it comes from the blast-furnace; secondly, to utilize the waste gases from the stack and economize fuel, and thirdly, to avoid the loss of carbon in the metal which would necessarily result where the metal was cast into pigs and then remelted for the subsequent steps of the process.

What I claim as my invention, and desire to secure by Letters Patent, is—

1. The process of producing cast-iron high in carbon, and having a determined percentage of silicon, which consists in smelting iron-ore in a blast-furnace, then conveying the metal into an open hearth and therein subjecting it to a temperature just above the point of fusion while in the presence of iron oxides until the silicon is eliminated, and then adding thereto a final charge of silicon, as silicious pig or ferro-silicide, whereby a metal high in carbon and having a predetermined percentage of silicon is produced.

2. The step in the process of producing cast-iron high in carbon, and having a determined percentage of silicon, which consists in subjecting molten cast-iron to a temperature just above its point of fusion while in the presence of iron oxides until the silicon is eliminated, and adding thereto a final charge of silicon, as silicious pig or silicide of iron, substantially as and for the purposes set forth.

3. The combination, with a blast-furnace, of an open-hearth furnace, the combustion-chamber of the open-hearth furnace being connected with the stack by a gas-conduit, and the working-chamber of the open hearth being connected with the crucible of the stack by a suitable conduit for the molten metal, substantially as and for the purposes specified.

4. In a plant for the production of chilling cast metal, the combination of a blast-furnace, one or more hot-blast regenerators, and an open-hearth furnace, the blast-furnace being connected with the hot-blast regenerators and with the open-hearth furnace by suitable gas-conduits, and with the open-hearth furnace, with a conduit for molten metal, and the hot-blast generator being connected with the open-hearth furnace by a suitable air-conduit, substantially as and for the purposes specified.

JACOB REESE.

Witnesses:
H. J. DUNCAN,
WALTER REESE.